Figure 1:
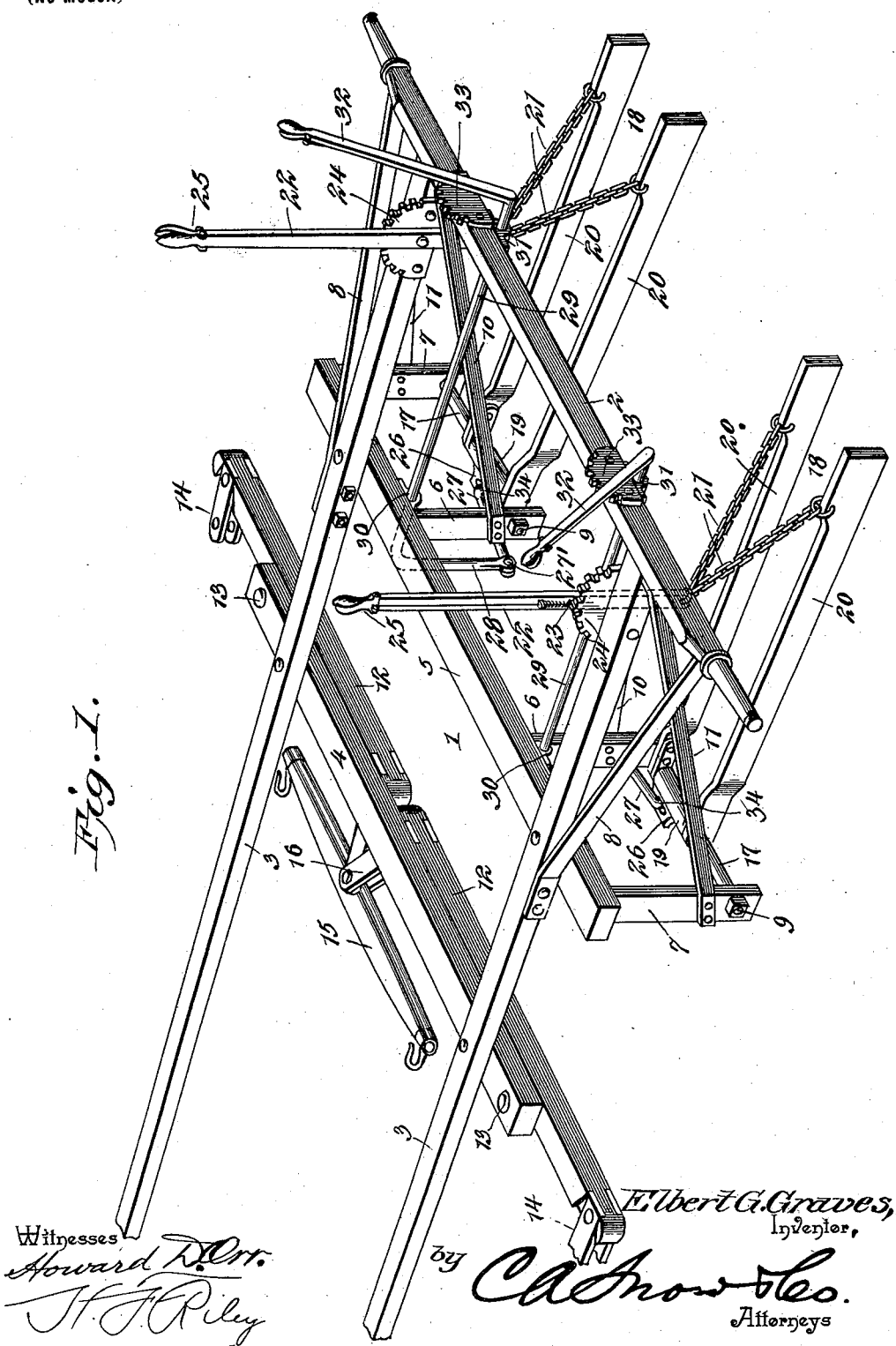

No. 661,047.

E. G. GRAVES.
CULTIVATOR AND PLANTER.
(Application filed Aug. 29, 1900.)

Patented Nov. 6, 1900.

(No Model.)

2 Sheets—Sheet 1.

Witnesses
Howard D. Orr.
H. J. Riley

Elbert G. Graves,
Inventor,
by C. A. Snow & Co.
Attorneys

No. 661,047. Patented Nov. 6, 1900.
E. G. GRAVES.
CULTIVATOR AND PLANTER.
(Application filed Aug. 29, 1900.)
(No Model.) 2 Sheets—Sheet 2.
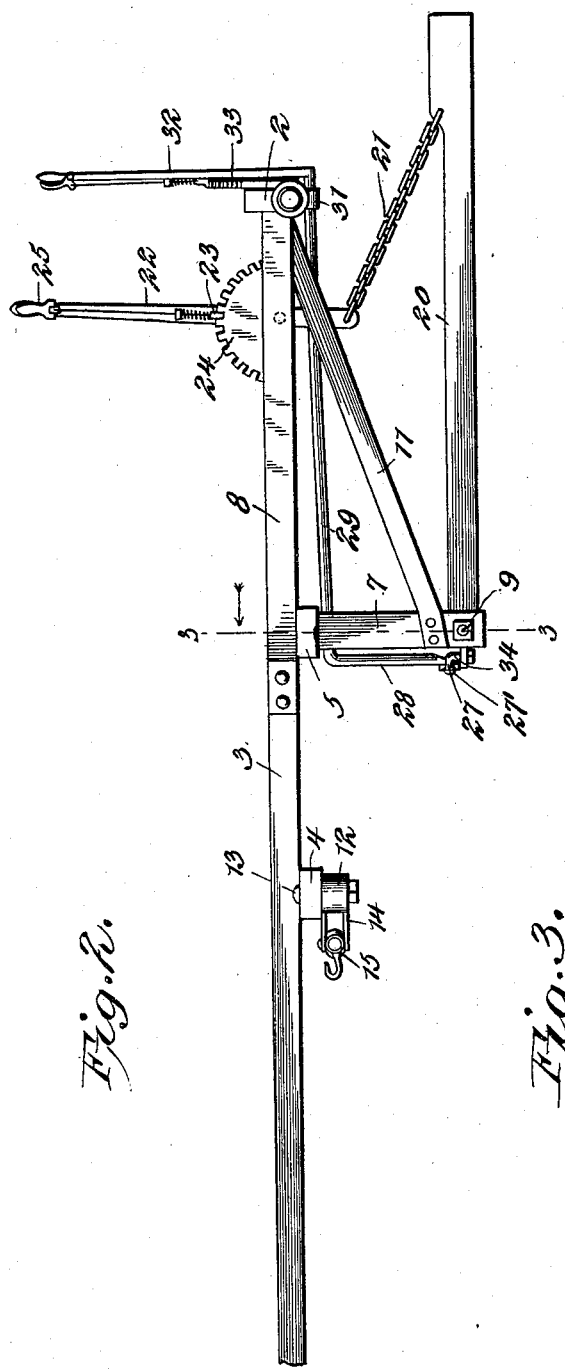
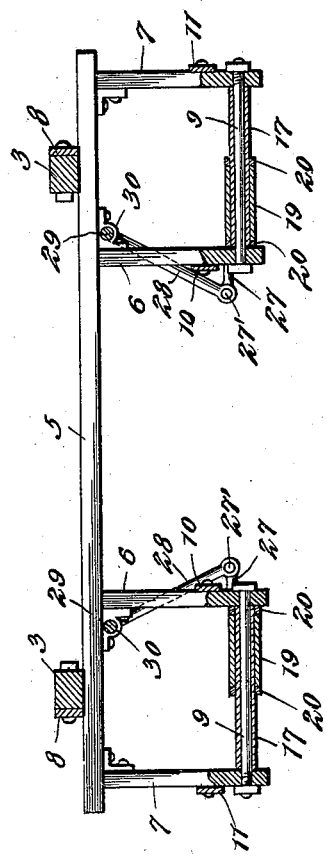
Witnesses
Howard D. Orr.
J. H. Riley
Elbert G. Graves, Inventor.
by C. A. Snow & Co.
Attorneys

UNITED STATES PATENT OFFICE.

ELBERT G. GRAVES, OF WAXAHACHIE, TEXAS.

CULTIVATOR AND PLANTER.

SPECIFICATION forming part of Letters Patent No. 661,047, dated November 6, 1900.

Application filed August 29, 1900. Serial No. 28,455. (No model.)

*To all whom it may concern:*

Be it known that I, ELBERT G. GRAVES, a citizen of the United States, residing at Waxahachie, in the county of Ellis and State of Texas, have invented a new and useful Planter, of which the following is a specification.

The invention relates to improvements in planters.

The object of the present invention is to improve the construction of planters, more especially the manner of mounting and adjusting the swinging frames, and to enable the said swinging frames to be readily adjusted vertically to raise and lower them from the ground and laterally to vary the distance between them to adapt the planter to the width of the row.

The invention consists in the construction and novel combination and arrangement of parts hereinafter fully described, illustrated in the accompanying drawings, and pointed out in the claims hereto appended.

In the drawings, Figure 1 is a perspective view of a portion of a planter provided with swinging frames and means for adjusting the same constructed in accordance with this invention. Fig. 2 is a side elevation of the same. Fig. 3 is a transverse sectional view on line 3 3 of Fig. 2.

Like numerals of reference designate corresponding parts in all the figures of the drawings.

1 designates a main frame provided at the back with an axle 2 and having shafts 3 extending forwardly therefrom and adapted to receive a horse or other draft-animal between them; but a pole or draft-beam may be arranged at the center of the planter, if desired. The axle is designed to receive carrying-wheels of the ordinary construction, and the shafts 3 are connected at a point between the front cross-bar 4 and the axle with a transverse beam 5, from which depend inner and outer arms 6 and 7, arranged in pairs, as clearly shown in Fig. 3. The main frame is supported by braces 8, extending from the axle to the shafts or thills and secured to the outer edges of the same adjacent to the transverse beam 5. The arms 7, which have their lower ends connected by horizontal rods 9, are supported by inner and outer braces 10 and 11, extending rearward from the arms and secured to the axle.

The planter is shown arranged for three horses or draft-animals, the center one being arranged between the shafts and the others at the outer sides thereof. The cross-bar 4 is extended beyond the shafts, and a pair of transversely-disposed levers is fulcrumed on its ends. These levers 12 are fulcrumed by bolts 13 or other suitable fastening devices located at points between the centers of the levers and the outer ends thereof, the inner arms being twice as long as the outer ones. A singletree 14 is designed to be connected with the outer end of each of the levers, and a central singletree 15 is connected with the inner ends of the levers by links 16. Any other arrangement or construction of draft-equalizer may be employed.

The bolts or rods 9, which are provided with heads and nuts, receive antifriction-sleeves 17, which form spindles or horizontal pintles for a pair of vertically-swinging laterally-movable frames 18, which are provided at their front ends with suitable sleeves 19, forming bearings. Each frame is composed of a pair of side bars 20, secured at their front ends to the ends of the sleeve 19 and designed to support the planting devices. These side bars 20 are connected by chains 21 with the lower end of an operating-lever 22, fulcrumed on the main frame, preferably at the inner side of the adjacent shaft 3, and provided with a spring-actuated pawl or detent 23 for engaging a curved ratchet 24. The spring-actuated detent is connected with a lever 25, mounted on the operating-lever adjacent to the grip thereof, so that the pawl or detent may be readily operated when the operating-lever is grasped.

The sleeves 19 are provided with forwardly-projecting flanges 26, which are perforated for the reception of links 27, and the latter extend inward and are pivoted by rivets 27, or other suitable fastening devices to depending arms 28 of rock-shafts 29. The rock-shafts 29, which are disposed longitudinally of the planter, are journaled in suitable bearings 30 and 31 of the transverse beam 5 and the axle 2 and are provided at their rear ends with upwardly-extending operating arms or levers 32. The operating arms or levers carry spring-actuated detents for engaging curved ratchets 33, which are mounted on the rear axle at opposite sides of the center thereof, as clearly shown in Fig. 1. The operating-levers are adapted to raise and lower the swinging frames, and the rock-shafts are capable of sliding the frames toward and from each other to vary the distance between them. The flexible connections between the sides of the swinging frames and the operating-levers do not interfere with the transverse adjustment of the frames 18, and the apertures of the flanges of the sleeves 19 are elongated, and the depending or engaging ends 34 of the links 27 fit loosely in the apertures to permit the swinging frames to be raised and lowered without affecting the connection of the links with the flanges and the depending arms of the rock-shafts.

It will be seen that the swinging frames, which are designed to support the planting devices, are adapted to be raised and lowered and are capable of lateral adjustment and that the operating mechanism for moving the swinging frames is arranged within convenient reach of the driver. The improvements are applicable to all kinds of cultivators and planters, and the shafts or thills which are interposed between the draft-animals are adapted to have the neck-yokes attached to their front ends.

What I claim is—

1. In a device of the class described, the combination of a supporting-frame provided with transverse pintles, swinging frames mounted on the transverse pintles and adapted to be raised and lowered, and capable of lateral adjustment, means for raising and lowering the swinging frames, and rock-shafts provided with arms connected with and adapted to move the frames laterally, substantially as described.

2. In a device of the class described, the combination of a supporting-frame provided with transverse pintles, swinging frames having bearings receiving the pintles, longitudinal rock-shafts provided with depending arms, links connecting the arms of the rock-shafts with the bearings of the swinging frames, and means for operating the rock-shaft, substantially as described.

3. In a device of the class described, the combination of a main frame provided with depending arms, rods connecting the arms, sleeves arranged on the rods, swinging frames provided with sleeves slidingly mounted on the said sleeves and having apertured flanges, longitudinal rock-shafts having depending arms, links extending from the depending arms of the rock-shafts, and engaging the apertures of the flanges, and means for operating the rock-shafts, substantially as described.

4. In a device of the class described, the combination of a frame provided with depending arms, pintles connecting the arms, swinging frames mounted on the pintles, longitudinal rock-shafts journaled on the main frame and provided at their front ends with depending arms connected with the swinging frames, operating-arms arranged at the rear ends of the rock-shafts, and means for raising and lowering the swinging frames, substantially as described.

In testimony that I claim the foregoing as my own I have hereto affixed my signature in the presence of two witnesses.

ELBERT G. GRAVES.

Witnesses:
EDWARD PLUMHOFF,
R. L. SCHMITT.